May 12, 1959 G. SIM 2,885,869
FLEXIBLE COUPLING
Filed Sept. 27, 1957
FIG. 1
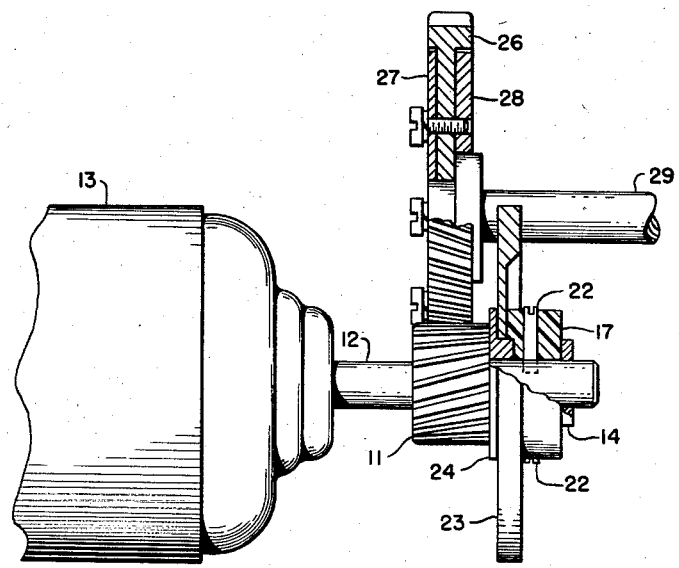
FIG. 2
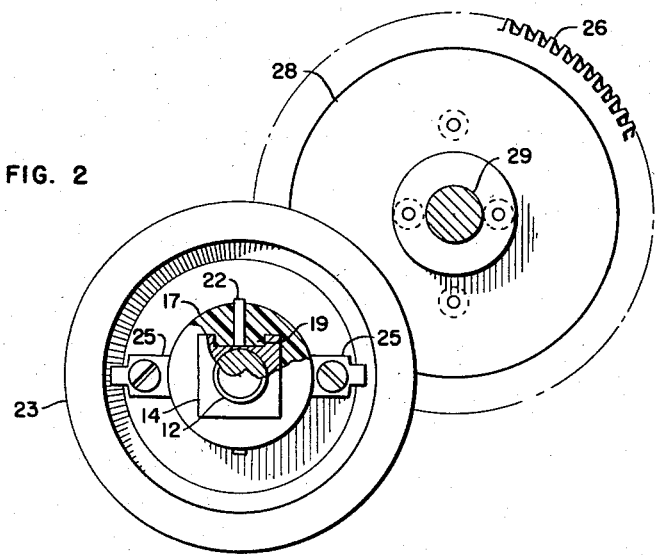
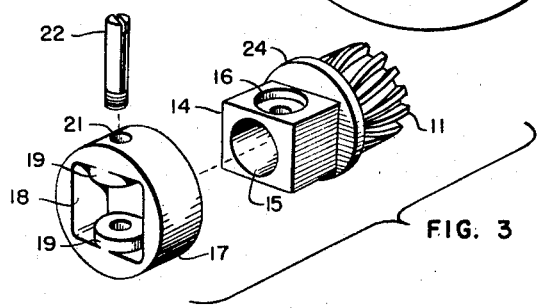
FIG. 3
INVENTOR
GORDON SIM
BY R.C. Terry
ATTORNEY

United States Patent Office 2,885,869
Patented May 12, 1959

2,885,869
FLEXIBLE COUPLING

Gordon Sim, Northbrook, Ill., assignor to Teletype Corporation, Chicago, Ill., a corporation of Delaware Application September 27, 1957, Serial No. 686,710

4 Claims. (Cl. 64—10)

The present invention pertains to a flexible coupling and more particularly to a flexible connection between driving and driven instrumentalities.

The principal object of the invention is to provide a resilient force transferring instrumentality readily interposable between elements of a power train.

Another object of the invention is to provide an effective and efficient driving connection which is noiseless and shock-proof.

It has been observed that a synchronous motor will vary in speed during a cycle, and that the pulsating rotor motion, which is particularly noticeable when the motor is used under a no load or light load condition, causes ball bearing chatter and vibration which is imparted to the gears and also results in the contact between the gear teeth being broken, creating a hammering effect. Moreover, the sliding friction of the gear teeth also causes the gears to resonate, resulting in an objectionable whining noise. With the arrangement according to the present invention a means has been provided for damping a gear set operating under the aforementioned conditions.

A better understanding of the present invention will be obtained from the following description taken in conjunction with the accompanying drawing, in which:

Fig. 1 is a side elevational view, partly in section, of the arrangement according to the present invention;

Fig. 2 is a front elevational view, partly in section, of said arrangement, and

Fig. 3 is an exploded perspective view of the coupling elements according to the invention.

In the specific embodiment herein described, the present invention is shown in combination with the pinion 11 carried telescopically on the shaft 12 of a motor 13, having reference to Fig. 1. The pinion 11 is provided integrally therewith with a hub 14, which is of square conformation in the preferred embodiment but which may be of any suitable geometric shape. Pinion 11 is provided with a shaft bore 15 (Fig. 3), and on the opposite faces of hub 14 there are provided transversely of the bore 15, a pair of apertures 16, which are shown circular in the present embodiment but which may be of any shape.

The coupling 17 (Fig. 3) of flexible material, such as rubber, is preferably cylindrical in shape, and is provided with a bore 18 of substantially the same conformation and size as the hub 14 which it is adapted to receive. Coupling 17 which is thereby adapted to encircle the hub 14 is provided, on the surfaces of bore 18 coincident with the apertured surfaces of hub 14, with integral confronting protuberances or buttons 19 of substantially the same conformation as apertures 16 into which they are adapted to fit snugly.

Coupling 17 is also provided with holes 21 in diametrical alignment with the buttons 19 so that after the coupling 17 is properly positioned over the hub 14 with the buttons 19 resting in the apertures 16, a pair of driving posts 22 (Figs. 1 and 2) are inserted through holes 21 and screwed, or otherwise fixed, into the motor shaft 12, whereby the gear 11 is driven through rubber by the shaft 12.

To aid in keeping the rotation of the gear 11 steady, a flywheel 23 may be interposed between coupling 17 and flange 24 of gear 11, and may be clamped to the gear 11 by means of clamping devices 25. In the embodiment shown in Figs. 1 and 2, the pinion 11 meshes with a gear 26 both of which gears are made of "nylon," whereby the resilience of said material is conducive to silent operation. Moreover, loading plates 27 and 28 are inserted into depressions in the sides of gear 26 and act to supply the mass necessary to absorb any noise created by the gear teeth.

Gear 26 is fixedly mounted on a shaft 29 through which power is transmitted smoothly and evenly to the machine to be operated. It has been found in practice that the driving and driven gears could be made of "nylon" for light loads, and of "nylon" and steel for heavy loads. However, in either case, the flexible coupling according to the present invention is essential for the driving gear.

It is to be understood that the above-described arrangement is simply illustrative of the application of the principles of the invention. Other arrangements may be devised by those skilled in the art which will embody the principles of the invention and fall within the spirit and scope thereof.

What is claimed is:

1. In combination, driving means, driven means telescopically carried thereon, said driven means having a portion provided with apertures therein, a flexible instrumentality bored to encircle said portion, pin means secured to said driving means and extending through said apertures and said instrumentality, said pin having a relatively close fit with respect to said instrumentality and having a substantial clearance with respect to said portion, and a pair of oppositely disposed confronting protuberances integrally formed on said instrumentality in the bore thereof, said protuberances adapted to fill said substantial clearance, whereby a flexible driving connection between driving means and said driven means is formed.

2. A flexible connection between a driving shaft member and a driven pinion member wherein said shaft member telescopes within said pinion member with a free sliding fit, said pinion member having a square shaped hub, a resilient rubber-like collar square-bored to encircle said hub, transversely disposed pin means passing substantially through said shaft member and said hub, said pin having a relatively close fit with respect to said collar and having substantial clearance with respect to said hub, and a pair of oppositely disposed confronting raised buttons integrally formed on said collar in the square bore thereof, said buttons adapted to fill said substantial clearance, whereby a flexible driving connection between said shaft member and said pinion is formed.

3. In combination, a drive shaft, a pinion telescopically carried thereon, said pinion provided with a hub having apertures therein, a flexible collar encircling said hub, pin means secured to said shaft and extending through said apertures and said collar, said pin having a relatively close fit with respect to said collar and having substantial clearance with respect to said hub, and a pair of oppositely disposed confronting raised buttons integrally formed on said collar in the bore thereof, said buttons adapted to fill said substantial clearance, whereby a flexible driving connection between said shaft and said pinion is formed.

4. In combination, a drive shaft, a pinion telescopically carried thereon, said pinion provided with a hub having apertures in opposite sides thereof, a flexible collar encircling said hub, transversely disposed pin means secured to said shaft and extending through said apertures and said collar, said pin having a relatively close fit with respect to said collar and having a substantial clearance with respect to said hub, and a pair of oppositely disposed confronting raised buttons integrally formed on said collar in the bore thereof, said buttons adapted to fill said substantial clearance, whereby a flexible driving connection between said shaft and said pinion is formed.

References Cited in the file of this patent

UNITED STATES PATENTS

| | | |
|---|---|---|
| 427,103 | Morgan | May 6, 1890 |
| 2,181,183 | Guy | Nov. 28, 1939 |
| 2,550,517 | Bales | Apr. 24, 1951 |
| 2,554,311 | Place | May 22, 1951 |
| 2,641,910 | Riopelle et al. | June 16, 1953 |
| 2,761,300 | Gredell | Sept. 24, 1956 |